United States Patent Office 2,772,244
Patented Nov. 27, 1956

2,772,244

TITANIUM-PHOSPHORUS CATALYST

Harold Shalit, Drexel Hill, Pa., and Arthur P. Lien, Highland, Ind., assignors to Standard Oil Company, Chicago, Ill., a corporation of Indiana No Drawing. Application December 1, 1952,
Serial No. 323,517

9 Claims. (Cl. 252—437)

The present invention relates to the catalytic promotion of hydrocarbon-conversion reactions, such as the polymerization of olefins, the isomerization of olefins, the alkylation of aromatics, the desulfurization of sulfur-containing stocks, and the like. More particularly, the invention relates to a solid catalyst of high selectivity and long life in such reactions, obtained by acid-modification of a titanium halide.

A great need exists for hydrocarbon-conversion catalysts intermediate in activity between the extremely active Friedel-Crafts type such as aluminum chloride and the comparatively weak mixed-oxide type such as silica-alumina. The required catalyst should preferably be refractory and non-complex forming, so that it can be used in commercial installations with a minimum of process and mechanical complications. To meet this need, the prior art has developed such compositions as phosphoric acid on kieselguhr, copper pyrophosphate, and ferric pyrophosphate on activated charcoal; and while all of these catalysts have certain advantages, they are seriously deficient in one respect or another. Phosphoric acid on kieselguhr, for example, is quite sensitive to moisture, so that the water content of the charging stock must be rigidly controlled; moreover, it agglomerates and hardens to a concrete-like solid during use which can be removed from the reactor only by the use of air hammers or other drastic means. Again, ferric pyrophosphate on activated charcoal and copper pyrophosphate have lengthy induction periods, produce relatively low conversions, and are of such low specific gravity that their yield-catalyst volume relationship is relatively unfavorable. Our new catalyst avoids all of these difficulties of the prior-art catalysts, and in addition has certain advantages which will be set forth more fully hereinafter.

Titanium chlorides and bromides are in themselves catalysts for many hydrocarbon-conversion reactions, but are not widely employed because they are over-active and insufficiently selective for most purposes, and they are in general of unsatisfactory physical form, the tetrachloride for example being a liquid under ordinary conditions. We have now succeeded in converting titanium halides into solids of suitable mechanical properties, while simultaneously moderating and modifying their catalytic activity, by commingling a titanium chloride or bromide with orthophosphoric acid by pyrophosphoric acid and heating the mixture to a temperature and for a time sufficient to liberate hydrogen halide therefrom in an amount approaching the theoretically derivable quantity. A gray, friable solid is obtained thereby of high selectivity and of long life in the conversion of hydrocarbons.

One object of our invention is to prepare an improved hydrocarbon-conversion catalyst. Another object is to prepare a catalyst of high selectivity in the polymerization, alkylation, isomerization, dehydrogenation, and desulfurization of hydrocarbons. A further object is to effect the conversion of hydrocarbons with improved selectivity and improved yield-catalyst volume relationship. A still further object is to prepare a titanium-based catalyst of moderated activity and improved selectivity. Another further object is to prepare an acid-modified titanium-based catalyst. Another object is to prepare a titanium-based catalyst of improved physical form. Another object is to prepare a phosphoric acid-based catalyst having low sensitivity to water. A specific object is to convert a mixture of titanium tetrachloride and orthophosphoric acid into a solid catalyst of improved properties in the conversion of hydrocarbons. Other objects of the invention and its superiority over the prior art will be apparent from the present description and claims.

In a preferred embodiment of our invention, titanium tetrachloride is commingled with orthophosphoric acid in a stirred vessel, and the mixture is warmed to such a temperature that hydrogen chloride is evolved in a steady but controlled stream. The reaction starts at ordinary temperatures, and proceeds rapidly at 60 to 100° C. As HCl evolution slows down, the temperature is increased gradually or stepwise to a maximum of 175° C. or above, preferably between about 175 and 250° C., optimally around 200° C., where it is maintained until HCl evolution has exceeded about 3.5 mole per mole of $TiCl_4$ and has practically ceased, and the original yellow color of the mixture has changed to gray. It is important to subject the reaction mixture to a temperature above about 175° C. for a sufficient length of time to drive off HCl in a quantity approaching the theoretically derivable amount, the most active catalysts being obtained at about 96 percent or more of the theoretical HCl evolution. Inadequate heating produces a yellow, inactive catalyst, which, however, can be converted into the gray, highly active material by a supplemental heating under the defined conditions.

Catalysts of our new class can satisfactorily be prepared from titanium tetrachloride, titanium tetrabromide, and other titanium chlorides and bromides. Suitable acids include orthophosphoric ($H_3PO_4$) and pyrophosphoric acids. Titanium tetrachloride, for example, reacts readily with orthophosphoric acid and gives good yields of solids which vary in consistency according to the ratio of the reactants. Semisolids are obtained when as little as 0.24 mole of $TiCl_4$ is allowed to react with one mole of $H_3PO_4$, while hard, dry, friable solids are obtained at a ratio of 0.38 or more. At ratios higher than about 0.7 mole per mole, the reaction product contains unreacted $TiCl_4$; such higher ratios should therefore be avoided where the presence of the free titanium halide in the reaction product is objectionable. In general, we prefer to contact titanium halide with phosphoric acid in an atomic ratio of halogen to active hydrogen between about 0.4:1 and 1:1, and we prefer to contact $TiCl_4$ with $H_3PO_4$ in a molar ratio between about 0.4:1 and 0.6:1. The reaction products are stable in air, and do not tend to form massive aggregates in the presence of water.

The reaction of titanium halide with phosphoric acid proceeds more readily and gives higher yields if the phosphoric acid is anhydrous or substantially anhydrous—i. e., contains less than about 2.5 percent by weight of water.

Our new catalyst composition needs no supporting material, but it can be composited if desired with porous or non-porous supports of the conventional type, such as kieselguhr, alumina, charcoal, silica gel, silica beads, glass beads, or the like, and may advantageously be formed into pellets therewith.

Our new catalysts may be promoted if desired by addition thereto of a small proportion (for example, 0.1 to 5 percent by weight) of a hydrogen halide such as hydrogen chloride or hydrogen bromide, or of a Friedel-Crafts halide, such as aluminum chloride.

For use in certain applications, we have found it desirable to treat the reaction product of titanium halide and phosphoric acid, prepared as described above, to increase the mechanical strength thereof. This can be accomplished by adding water to the said reaction product and drying, suitably at a temperature of 25 to 210° C., preferably under vacuum at 25 to 110° C. The proportion of water added may satisfactorily range from about 1 percent upward.

Alternatively, a catalyst of superior mechanical strength can be obtained by carrying out the reaction of titanium halide with phosphoric acid in two stages. In the first stage, the mixed reactants are heated to a temperature below about 150° C. until the evolution of hydrogen halide slows markedly or substantially stops. A yellow, catalytically inactive solid is obtained thereby. This solid is subsequently heated to a temperature above about 175° C., preferably between about 175 and 250° C., optimally around 200° C., to drive off further quantities of hydrogen halide, and the heating is again continued until the evolution of hydrogen halide approaches substantial completion. A gray solid is obtained thereby which is highly active as a catalyst, and has a crushing strength in excess of six pounds, applied axially to the catalyst in the form of ⅛-inch cylindrical pellets.

Our catalysts show little tendency to promote side reactions such as gas formation and carbon deposition, and therefore tend to retain their initial activity for extended processing periods. Under certain reaction conditions, however, and especially in treating certain charging stocks, the catalysts tend to lose their activity more or less rapidly, and must eventually be either discarded or regenerated in some way. For example, when high temperatures above about 270° C. are used for polymerizing propylene or other olefins, the catalyst activity gradually drops off. As another example, the desulfurization of West Texas virgin gas oil drastically and rapidly lowers the catalyst activity. It has been discovered that the activity of catalysts deactivated in these and similar ways can be restored by treatment in hydrogen at 350 to 500° C. and 500 pounds per square inch or more for a period of about 0.5 hour or more.

The chemical nature of our new catalyst is uncertain. Its infrared spectrum had been determined, using a thin film of powdered catalyst on a sodium chloride plate, and the spectrum shows the presence of hydroxyl groups, both free and hydrogen-bonded, as well as water, either adsorbed or as water of crystallization. Another structure shown to be present was the P—O bond, either in the P—OH or P—O—Ti sequence. Surprisingly, however, there was no indication of the presence of the P=O structure, which might be expected to have been retained from the phosphate group entering into the catalyst preparation. X-ray diffraction studies were also made on this catalyst, and indicate that the material is at least partly crystalline, but corresponds to no compound for which diffraction data are available. Elemental analyses of the catalyst have been unsuccessful, owing to its extreme resistance to dissolution in all of the usual solvents.

Our new catalysts are useful in a wide variety of hydrocarbon-conversion reactions, such as the polymerization of $C_3$ and higher olefins and of other unsaturated hydrocarbons at around 150 to 300° C. to form liquids or oils of higher molecular weight; the alkylation of aromatics or isoparaffins with olefins or olefin-affording substances; the isomerization of paraffins or naphthenes; the isomerization of alkylbenzenes such as xylenes, trimethylbenzenes, higher-alkyl xylenes, and the like; the desulfurization or hydrodesulfurization of petroleum fractions containing organic sulfur compounds, such as West Texas virgin heavy naphtha, coke still naphtha, and the like; the side-chain dehydrogenation of alkyl aromatics such as ethylbenzene, isopropylbenzene, and the like; the treatment of motor fuels to increase their antiknock rating; and the like. The catalyst is conveniently employed as a powder, slurried in the charging stock, or as solid particles, pellets, or pills, in a fixed or moving bed. Numerous alternative processes and reactor designs will be apparent to those skilled in the art.

Our invention will be more fully understood from the following specific examples.

*Example 1*

Into a three-neck 500-milliliter flask, fitted with a dropping funnel, stirrer, and reflux condenser, were placed 98 grams (1 mole) of anhydrous $H_3PO_4$; and 91 grams (0.48 mole) of $TiCl_4$ were added dropwise, with stirring. Soon after the addition of $TiCl_4$ had been started, the contents of the reaction flask became doughy, and HCl vapors began to be evolved. The HCl was continuously swept out of the flask with a stream of nitrogen into a flask of ice-cold water, which was ultimately titrated. After all of the $TiCl_4$ had been added, the mixture was heated to reflux, and HCl was liberated in a steady stream while the mixture gradually solidified. As soon as HCl evolution had slowed down considerably, heating was stopped, and the solid was removed from the flask and placed under vacuum for several hours to remove unreacted $TiCl_4$.

To test the activity of the resulting catalyst, 46 grams were sealed in a 500-milliliter Aminco rocking bomb, 92 grams of propylene were added from a weighed container, and the bomb was rocked and heated to 165° C. The pressure rose to a maximum of 1160 pounds per square inch, then fell rapidly, and after two hours had leveled off at 460 pounds per square inch. After a total exposure time of five hours, the bomb was cooled and unloaded, and 49 grams of liquid polymer were recovered, corresponding to a conversion of 53.5 percent by weight.

*Example 2*

A series of catalysts were prepared and tested according to the procedure described in Example 1, employing several different ratios of $TiCl_4$ to $H_3PO_4$. The results indicate that the ratio of $TiCl_4$ to $H_3PO_4$, within the range tested, has very little effect on the production of polymer.

| Molar ratio, $TiCl_4$:$H_3PO_4$ | Catalyst charged, g. | Propylene charged, g. | Polymerization temperature, ° C. | Conversion, wt., percent |
|---|---|---|---|---|
| 0.38 | 10 | 102 | 160–170 | 54 |
| 0.38 | 10 | 95 | 170 | 50 |
| 0.5 | 46 | 92 | 150–160 | 53.3 |
| 0.5 | 10 | 86 | 170 | 42 |
| 0.67 | 10 | 88 | 170 | 47 |

The polymeric product was mainly propylene trimer. Practically no dimer was observed and only very small quantities of material boiling higher than $C_9$ hydrocarbons.

*Example 3*

A 0.4:1 Tifo catalyst was prepared by commingling 113.8 grams (0.6 mole) of $TiCl_4$ with 147 grams (1.5 moles) of anhydrous $H_3PO_4$ and heating to a temperature above about 175° C. until HCl evolution had substantially ceased. A portion of the resulting friable gray solid was ground with mortar and pestle, passed through a 28-mesh screen, and subjected to specific gravity determination by heptane displacement, in which its specific gravity was shown to be 2.34.

Another portion of the 0.4:1 Tifo catalyst (45 milliliters, 56.8 grams) was charged into a cylindrical flow reactor having an inside diameter of one inch and was tested over a range of temperatures in the polymerization of a 50:50 (by weight) mixture of propylene and propane. The results were as follows:

| Polymerization temperature, °C. | Pressure, p. s. i. g. | Space velocity, hr.⁻¹ | Polymer yield, g. | Conversion, wt., percent |
|---|---|---|---|---|
| 150 | 270–280 | 1.55 | 18.8 | 18.8 |
| 206 | 260 | 1.35 | 55 | 58.5 |
| 235 | 260–280 | 1.3 | 64 | 64.5 |

Example 4

The tests described in Example 3 were continued over a range of pressures at substantially constant temperature. Higher pressures were found to produce higher yields of polymer.

| Pressure, p. s. i. g. | Temp., °C. | Space velocity, hr.⁻¹ | Polymer yield, g. | Conversion, wt., percent |
|---|---|---|---|---|
| 260 | 206 | 1.35 | 55 | 58.5 |
| 350 | 205 | 1.6 | 64.5 | 64.5 |
| 440 | 205 | 1.38 | 72.8 | 72.8 |
| 550 | 202 | 1.35 | 66 | 73 |

Example 5

In a further extension of the tests described in Example 3, higher space velocities were found to lead to lower polymer yields, the temperature and pressure being held substantially constant.

| Space velocity, hr.⁻¹ | Temp., °C. | Pressure, p. s. i. g. | Polymer yield, g. | Conversion, wt., percent |
|---|---|---|---|---|
| 0.68 | 206–8 | 290 | 42.8 | 71.5 |
| 0.78 | 208 | 290 | 25.9 | 70 |
| 0.93 | 204–7 | 260–290 | 27 | 62 |
| 1.35 | 206 | 260 | 55 | 58.5 |
| 2.05 | 208 | 260–270 | 48.9 | 49 |
| 5.1 | 208 | 260–280 | 26.2 | 26 |

Example 6

The "0.4:1 Tifo" catalyst of Example 3 was subjected to a life test in the polymerization of 50:50 (by weight) propane-propylene, employing a cylindrical flow-reactor charged with 45 milliliters (56.8 grams) of catalyst. The product was collected and analyzed at intervals, with the following results:

| Test period | Polym. temp., °C. | Pressure, p. s. i. g. | Average sp. vel., hr.⁻¹ | Polymer yield, ml. | Polymer, $n_D^{20}$ | Conversion, wt., percent |
|---|---|---|---|---|---|---|
| 1 | 210 | 250–260 | 1.2 | 46 | 1.4263 | 33 |
| 2 | 210 | 250–260 | 0.8 | 60 | 1.4289 | 44 |
| 3 | 210 | 250–260 | 1.2 | 65 | 1.4307 | 47.8 |
| 4 | 210 | 250–260 | 1.2 | 71.5 | 1.4309 | 53.5 |
| 5 | 210 | 250–260 | 1.2 | 63.5 | 1.4321 | 47.4 |
| 6 | 210 | 250–260 | 1.14 | 71 | 1.4303 | 52.6 |
| 7 | 210 | 250–260 | 1.27 | 78 | 1.4301 | 59.1 |
| 8 | 210 | 250–260 | 1.29 | 58 | 1.4316 | 43.9 |
| 9 | 210 | 250–260 | 1.17 | 72 | 1.4302 | 53.6 |
| 10 | 186 | 250–260 | 1.06 | 56 | 1.4319 | 41.8 |

At this point, the reactor was opened and the catalyst was removed for examination. The top ½-inch was black, while the remainder was unchanged. The catalyst was returned to the reactor, and the life test was resumed.

| Test period | Polym. temp., °C. | Pressure, p. s. i. g. | Average sp. vel., hr.⁻¹ | Polymer yield, ml. | Polymer, $n_D^{20}$ | Conversion, wt., percent |
|---|---|---|---|---|---|---|
| 11 | 206 | 260–270 | 0.8 | 41 | 1.4280 | ¹31 |
| 12 | 203 | 280 | 0.56 | 17 | 1.4281 | ¹12 |
| 13 | 207 | 260 | 1.3 | 81 | 1.4271 | 61 |
| 14 | 207 | 260 | 0.6 | 45 | 1.4270 | ¹33 |
| 15 | 210 | 265 | 1.3 | 55 | 1.4271 | 40 |
| 16 | 237 | 265 | 1.36 | 88 | 1.4230 | 64 |

¹ Mechanical losses.

At the end of this period, the catalyst was accidentally heated to 590° C. for 2 hours in the absence of charging stock. Subsequent tests showed that this treatment did not harm the catalyst.

| Test period | Polym. temp., °C. | Pressure, p. s. i. g. | Average sp. vel., hr.⁻¹ | Polymer yield, ml. | Polymer, $n_D^{20}$ | Conversion, wt., percent |
|---|---|---|---|---|---|---|
| 17 | 206 | 260 | 1.35 | 74 | 1.4269 | 58.5 |
| 18 | 206 | 270 | 0.98 | 37 | 1.4268 | 62 |
| 19 | 207 | 273 | 2.0 | 67 | 1.4262 | 50.8 |
| 20 | 203 | 440 | 1.38 | 99.7 | 1.4263 | 72.8 |
| 21 | 205 | 350 | 1.6 | 88 | 1.4262 | 64.5 |
| 22 | 201 | 520 | 1.3 | 82 | 1.4285 | 61 |
| 23 | 207 | 290 | 0.68 | 59 | 1.4245 | 71.5 |
| 24 | 208 | 290 | 0.78 | 35 | 1.4319 | 65 |
| 25 | 202 | 550 | 1.35 | 90 | 1.4296 | 73 |
| 26 | 208 | 265 | 2.05 | 68 | 1.4257 | 49 |
| 27 | 200 | 300 | 0.7 | 36 | 1.4257 | 74 |
| 28 | 200 | 900 | 1.3 | 68 | 1.4251 | 69.4 |
| 29 | 200 | 900 | 1.3 | 71 | 1.4256 | ¹51.2 |
| 30 | 200 | 1500 | 1.3 | 90 | 1.4250 | 68.7 |
| 31 | 200 | 300 | 1.3 | 62 | 1.4244 | 54.2 |
| 32 | 200 | 900 | 1.3 | 60 | 1.4251 | 57.2 |
| 33 | 235 | 900 | 1.3 | 80 | 1.4258 | 77.7 |
| 34 | 235 | 900 | 1.3 | 82 | 1.4255 | 71.7 |
| 35 | 250 | 900 | 1.3 | 90 | 1.4232 | 84.3 |
| 36 | 246 | 900 | 1.3 | 30 | 1.4230 | 58.8 |

¹ Mechanical difficulties.

Example 7

A series of propylene polymers were prepared as described in Example 3 at a liquid hourly space velocity of 1.3 and a variety of temperatures and pressures. The polymers were found to have the following properties:

| | | | |
|---|---|---|---|
| Polymerization temp., °C. | 200 | 235 | 250 |
| Polymerization press., p. s. i. g. | 300 | 300 | 900 |
| ASTM distillation, °F: | | | |
| Initial | 186 | 156 | 154 |
| 10% | 253 | 210 | 206 |
| 50% | 321 | 282 | 278 |
| 90% | 431 | 378 | 372 |
| Max | 548 | 444 | 446 |
| Reid vapor pressure, p. s. i. | 3.2 | | 2.9 |
| Octane No. (CFR–R) | 82.2 | | 86.3 |
| Refractive index, $n_D^{20}$ | 1.4290 | 1.4230 | 1.4222 |

Example 8

Into a 3-neck flask, fitted with a dropping funnel, stirrer, and reflux condenser, were placed 98 grams (1 mole) of anhydrous $H_3PO_4$, and to the acid were added dropwise 73 grams (0.38 mole) of $TiCl_4$. Shortly after the addition of $TiCl_4$ had been started, the mixture became viscous and began to evolve HCl. After all the $TiCl_4$ has been added, the mixture was heated with an electric heating mantle, and HCl was given off in a steady stream. The mixture gradually solidified as HCl evolution slowed considerably. The solid was removed from the flask and placed in a vacuum oven for several hours to remove unreacted $TiCl_4$, after which the catalyst was ready for use.

Into a 500-milliliter Aminco rocking bomb were placed 10 grams of the catalyst prepared as described above, 150 grams (1.9 moles) of benzene, and 50 grams (1.2 moles) of propylene. The mixture was heated with agitation to 140° C., at which temperature the pressure had reached 540 pounds per square inch, and was maintained at 140–150° C. for 5 hours. During this time the pressure fell rapidly, most of the reaction taking place during the first hour, until it leveled off at 340 pounds per square inch. The bomb contents were unloaded and fractionally distilled, and 50.4 grams of cumene were isolated, representing a 35 percent by weight conversion based on propylene. In addition 5.9 grams of material boiling in the range of propylene trimer were isolated, and 6.3 grams of material boiling higher than cumene, probably a mixture of polyalkylate and higher propylene polymers. At the end of this test the catalyst appeared essentially unchanged.

Example 9

In an analogous test on the alkylation of toluene, 10 grams of a catalyst prepared as described in Example 8 were charged into a rocking bomb, together with 180 grams (2 moles) of toluene and 41 grams (1 mole) of propylene, and the bomb was rocked and heated to 150° C. The pressure rose to a maximum of 520 pounds per square inch and fell to 290 pounds per square inch by the end of six hours. From the products were isolated 47.3 grams of cymene, corresponding to a conversion of 35.3 percent by weight, based on propylene. The isomer distribution in the cymene fraction was 16% ortho, 51% meta, and 33% para. From the product were also separated 7 grams of low-boiling material and 6.7 grams of material boiling higher than the cymenes. The used catalyst appeared to be unchanged.

*Example 10*

In another alkylation test, 10 grams of a catalyst prepared as described in Example 8 were commingled in a rocking bomb with 180 grams (2 moles) of toluene and 69 grams (1.64 moles) of propylene, and the mixture was rocked and heated to 230° C. The maximum pressure was 800 pounds per square inch at 205° C., and fell to 330 pounds per square inch at 230° C. after four hours. From the product were obtained 89.1 grams of cymenes (21% ortho, 49% meta, 30% para) in 40.5 percent conversion (by weight), based on propylene. There were also obtained 12.9 grams of material boiling in the propylene trimer range and 14.7 grams of material boiling higher than the cymenes. The used catalyst appeared unchanged, no coke deposition being noted.

In the foregoing alkylation tests, it should be noted that relatively low aromatic-to-olefin molar ratios were used, below about 2. Substantially improved results can be expected with higher ratios up to about 6 or 7. The effect of raising the proportion of aromatic would be to reduce the yield of propylene polymer and polyalkylate to even lower levels and to increase the conversion of propylene to monoalkylate. The temperature employed in the alkylation reaction should be in the range of 100 to 350° C., preferably between about 150 and 300° C. In batch operations, the pressure is controlled by the propylene concentration. In flow systems, the pressure may be held between about 50 and 1500 pounds per square inch, preferably between about 200 and 1000 pounds per square inch.

*Example 11*

A series of experiments were carried out to determine the minimum temperature required to produce an active catalyst by heating a mixture of $TiCl_4$ and anhydrous $H_3PO_4$. In each experiment, $TiCl_4$ was added dropwise to $H_3PO_4$ to a molar ratio of 0.38:1. The mixture was then warmed to the desired temperature until a desired quantity of HCl had been evolved, or until HCl evolution had slowed. The resulting solid was outgassed in a vacuum oven and finally tested at a catalyst concentration level of 11% in the batch polymerization of propylene. The results were as follows:

| Temp. of cat. prep., ° C. | HCl:TiCl₄ ratio, molar | Polymerization temperature, ° C. | Polymer yield, wt. percent |
| --- | --- | --- | --- |
| 100 | 2.9 | 152 | 3 |
| 130-140 | 3.5 | 150 | 0 |
| 150 | 3.5 | 154 | 12 |
| 150 | 3.5 | 166 | 50 |

*Example 12*

A series of catalysts were prepared using aqueous 85%, 91.4%, 98.2%, and anhydrous $H_3PO_4$. In each case, $TiCl_4$ was added dropwise to $H_3PO_4$ of the desired composition to a final $TiCl_4:H_3PO_4$ molar ratio of 0.67:1. The mixture was then heated to a temperature around 200° C. until HCl evolution had slowed, and the resulting solid was outgassed in a vacuum oven. The completed catalysts were tested at a level of 11% in the batch polymerization of propylene at 190° C., with the following results:

| $H_3PO_4$ purity, percent | Polymer yield, wt.-percent | Polymer, $n_D^{20}$ |
| --- | --- | --- |
| 85 | 20 | 1.4215 |
| 91.4 | 25.6 | 1.4245 |
| 98.2 | 53 | 1.4339 |
| 100 | 52.2 | 1.4317 |

*Example 13*

Isopropylbenzene was passed at 540° C. and 0.41 liquid hourly spaced velocity over a $TiCl_4H_3PO_4$ catalyst, and a product was obtained containing alpha-methylstyrene in a conversion of 25.7 percent of theoretical. This result is strikingly different from the results obtained with cracking catalysts, which give 80% dealkylation under the same conditions.

*Example 14*

A mixture of $C_8$ aromatic hydrocarbons consisting essentially of xylenes and 31 percent ethylbenzene was passed at 540° C. and 0.4 liquid hourly space velocity over a $TiCl_4$-$H_3PO_4$ catalyst, and a product was obtained containing 4 percent styrene, corresponding to an ethylbenzene conversion of 12 percent. There was no evidence of dealkylation, disproportionation, or other side reactions.

*Example 15*

Commercial-grade meta-xylene was passed at 400° C., atmospheric pressure, and 0.80 liquid hourly space velocity over a catalyst prepared by reacting 0.4 mole $TiCl_4$ with 1.0 mole $H_3PO_4$ according to the procedure set forth above. The treated charge showed no evidence of cracking or other disproportionation reactions. The feed and product were shown by analysis to have the following compositions in mole-percent:

| | Feed | Product |
| --- | --- | --- |
| Ethylbenzene | 1.1 | 1.8 |
| o-Xylene | 2.1 | 7.2 |
| m-Xylene | 94.5 | 80.7 |
| p-Xylene | 2.5 | 10.2 |

Our new catalyst has numerous advantages over the catalysts of the prior art. It is a light-gray, friable solid, readily adapted to fabrication in the various forms in which catalysts are commonly employed. It is immediately active, giving excellent conversions and yields, and high output of product per unit volume of catalyst. It is insensitive to water and oxygen, and no addition of water to the charging stock or removal of water therefrom is required to maintain its effectiveness. It is extraordinarily resistant to dissolution in most solvents, and therefore shows no tendency to swell during use, to change in strength, or to build up resistance to flow of fluids through the reactor. It does not tend to agglomerate and solidify into hard masses, and therefore offers no problem of removal from the reactor when exhausted. It does not release phosphoric acid or other acid during use; the reactor effluent is therefore non-corrosive. It has little or no tendency to deposit coke or otherwise to disproportionate charging stocks under the conditions usually employed for polymerization, alkylation, isomerization, desulfurization, and the like. Finally, it has a long and stable active life; and even when it ultimately becomes deactivated, it can readily be regenerated by simple means.

While we have described our invention with reference to certain embodiments thereof, it is to be understood that such embodiments are illustrative only and that the true scope of our invention is set forth elsewhere in the description and claims. It is to be further understood that any modifications or equivalents of our invention that would ordinarily occur to one skilled in the art are to be considered as lying within the scope of our invention.

In accordance with the foregoing description, we claim as our invention:

1. A process for the manufacture of a solid, self-supporting catalyst which consists essentially of mixing a titanium halide selected from the group consisting of the chlorides and bromides of titanium with a phosphoric acid selected from the group consisting of orthophosphoric and pyrophosphoric acids in an atomic ratio of halogen to active hydrogen between about 0.4:1 and 1:1 and heating the resulting mixture at a temperature above about 175° C. until evolution of hydrogen halide therefrom substantially ceases.

2. A process for the manufacture of a solid, self-supporting catalyst which consists essentially of mixing a titanium chloride with orthophosphoric acid in an atomic ratio of chlorine to active hydrogen between about 0.4:1 and 1:1 and heating the resulting mixture at a temperature above about 175° C. until evolution of hydrogen chloride therefrom substantially ceases.

3. A process for the manufacture of a solid, self-supporting catalyst which consists essentially of mixing titanium tetrachloride with orthophosphoric acid in a molar ratio above about 0.38:1, heating the resulting mixture to a temperature of at least 150° C. to promote interaction of the components thereof with evolution of hydrogen chloride, and continuing said heating until said evolution of hydrogen chloride exceeds 3.5 moles per mole of titanium tetrachloride and substantially ceases.

4. A process for the manufacture of a solid, self-supporting catalyst which consists essentially of mixing titanium tetrachloride with substantially anhydrous orthophosphoric acid in a molar ratio between about 0.38:1 and 0.7:1, heating the resulting mixture to a temperature of at least 150° C. to promote interaction of the components thereof with evolution of hydrogen chloride, and continuing said heating until said evolution of hydrogen chloride exceeds 3.5 moles per mole of titanium tetrachloride and substantially ceases.

5. A process for the manufacture of a solid, self-supporting catalyst which consists essentially of mixing titanium tetrachloride with substantially anhydrous orthophosphoric acid in a molar ratio between about 0.4:1 and 0.6:1, heating the resulting mixture to a temperature between about 175 and 250° C. to promote interaction of the components thereof with evolution of hydrogen chloride, and continuing said heating until evolution of hydrogen chloride exceeds 3.5 moles per mole of titanium tetrachloride and substantially ceases.

6. A process for the manufacture of a gray, friable self-supporting solid catalyst which consists essentially of mixing titanium tetrachloride with substantially anhydrous orthophosphoric acid in a molar ratio between about 0.4:1 and 0.6:1, heating the resulting mixture to a temperature around 200° C. to promote interaction of the components thereof with evolution of hydrogen chloride, and continuing said heating until at least about 96 percent of the theoretically derivable hydrogen chloride has been evolved.

7. The solid, self-supporting reaction product of a phosphoric acid and a titanium halide, prepared by mixing a titanium halide selected from the group consisting of the chlorides and bromides of titanium with a phosphoric acid selected from the group consisting of orthophosphoric and pyrophosphoric acids in an atomic ratio of halogen to active hydrogen between about 0.4:1 and 1:1 and heating the resulting mixture at a temperature above about 175° C. until evolution of hydrogen halide therefrom substantially ceases.

8. The solid, self-supporting reaction product of a titanium chloride and orthophosphoric acid, prepared by mixing a titanium chloride with orthophosphoric acid in an atomic ratio of halogen to active hydrogen between about 0.4:1 and 1:1 and heating the resulting mixture at a temperature above about 175° C. until evolution of hydrogen chloride therefrom substantially ceases.

9. The solid, self-supporting reaction product of titanium tetrachloride and orthophosphoric acid, prepared by mixing titanium tetrachloride with substantially anhydrous orthophosphoric acid in a molar ratio between about 0.38:1 and 0.7:1, heating the resulting mixture to a temperature between about 175 and 250° C. to promote interaction of the components thereof with evolution of hydrogen chloride, and continuing said heating until said evolution of hydrogen chloride exceeds 3.5 moles per mole of titanium tetrachloride and substantially ceases.

References Cited in the file of this patent

UNITED STATES PATENTS

| | | |
|---|---|---|
| 2,358,011 | Ipatieff et al. | Sept. 12, 1944 |
| 2,569,092 | Deering | Sept. 25, 1951 |

OTHER REFERENCES

Anhydrous Aluminum Chloride, in Organic Chemistry, C. A. Thomas, Reinhold Publ. Co., New York, 1941, pages 875 to 877.